3,218,329
O-PYRIDYL KETOXIMES AND ALDOXIMES
Leo A. Paquette, Portage Township, Kalamazoo County,
Mich., assignor to The Upjohn Company, Kalamazoo,
Mich., a corporation of Delaware
No Drawing. Filed Jan. 17, 1963, Ser. No. 252,061
8 Claims. (Cl. 260—296)

This invention pertains to novel organic compounds and to a process for preparing them. More particularly, the invention is directed to novel O-pyridyl ether oximes which, in their free base form, are represented by the structural formula selected from the group consisting of

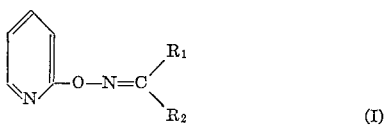

and

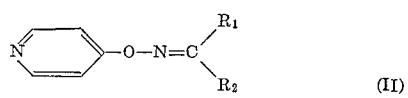

wherein $R_1$ is selected from the group consisting of hydrogen and lower-alkyl and $R_2$ is lower-alkyl. Examples of lower-alkyl are methyl, ethyl, propyl, butyl, pentyl, hexyl, heptyl, octyl, and isomeric forms thereof.

The novel free base compounds of Formulas I and II form acid addition salts with acids, and quaternary ammonium salts with, for example, alkyl halides. Furthermore, the ring nitrogen can be oxidized to form amine oxides. It is to be understood, therefore, that acid addition salt, quaternary ammonium salt, and N-oxide derivatives of the free base compounds of Formulas I and II are contemplated as embodiments of the invention.

The novel free base compounds of Formulas I and II are prepared by O-alkylation of aldoximes and ketoximes respresented by the structural formula

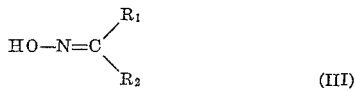

wherein $R_1$ and $R_2$ are as defined above with a 2- or 4-halopyridine wherein the halogen is, for example, chlorine or bromine. The reaction is carried out in the presence of a base and a suitable inert organic solvent. In general, bases such as alkali metal alkoxides, for example, sodium methoxide, sodium ethoxide, potassium tert-butoxide, and like alkoxides are employed. Other bases such as sodium and potassium hydroxides can also be employed. Suitable inert organic solvents are advantageously those in which the reactants are appreciably soluble. Tertiary butanol is a preferred solvent, but solvents such as other alkanols, for example, methanol, ethonal, propanol, and the like, dioxane, tetrahydrofuran, and dimethylformamide can also be employed. The reaction is advantageously carried out at elevated temperature, conveniently at temperatures of about 50° C. up to about 120° C. Higher or lower temperatures can be used, but, preferably, the reaction is carried out at temperatures of about 75° C. up to about 100° C. Stoichiometric proportions of the reactants are ordinarily employed. However, greater or less than stoichiometric proportions of either reactant can be used. The desired free base O-pyridyl ether oximes of Formulas I and II are isolated from the reaction mixture according to conventional methods, such as solvent evaporation, solvent extraction, distillation, salt formation, crystallization, and the like.

In a preferred form of the process of the invention, a dry, powdered alkali metal salt (e.g., sodium or potassium salt) of an aldoxime or ketoxime according to Formula III is condensed with a 2- or 4-halopyridine in the presence of a solvent such as dimethylformamide or tert-butanol. This method overcomes the objectionable formation of alkoxypyridines as a side-reaction, such as may occur to a considerable extent when the reaction is carried out in the presence of primary alkanols such as ethanol.

In general, alkali metal salts of aldoximes and ketoximes having the Formula III are prepared by reacting a base, illustratively, an alkali metal alkoxide, e.g., sodium ethoxide, with the desired oxime, according to conventional methods in the presence of the alkanol corresponding to the alkoxide. Alkali metal alkoxides suitable for reaction with a desired oxime are ordinarily prepared by reacting an excess of alkanol with an alkali metal, e.g., sodium or potassium. Advantageously, the alkali metal salt of the oxime, thus obtained, is recovered from the reaction mixture by removing the alkanol and the reaction in tert-butanol, dmethylformamide, and like solvents is carried out as indicated above.

The novel O-pyridyl ether oximes of Formulas I and II exist either in the nonprotonated (free base) form or the protonated form depending upon the pH of the medium. They form stable protonates (acid addition salts) on treatment with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexane-sulfamic acids, and the like. These acid addition salts are useful in upgrading the free bases.

The novel compounds of Formulas I and II also form alkyl quaternary ammonium salts by reaction with an alkyl halide, for example, an alkyl chloride, bromide, or iodide, or by reaction with an alkyl nitrate, an alkali metal alkyl sulfate, a dialkyl sulfate, an alkyl arylsulfonate, and the like. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalenesulfonate, acetate, benzoate, salicylate, hydrocinnamate, succinate, lactate, or the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof.

The amine oxides are obtained by reaction with a peroxidizing agent, for example, hydrogen peroxide, perbenzoic acid, monoperphthalic acid, and peracetic acid. The reaction is advantageously carried out in a solvent, illustratively, glacial acetic acid, aqueous acetic acid, ethanol, and aqueous ethanol. The reaction proceeds satisfactorily at about 60° C.; however, higher or lower temperatures can be used. The amine oxides are separated from the reaction mixture and recovered in pure form by conventional procedures such as filtration, solvent evaporation, solvent extraction, and crystallization.

The novel compounds of Formulas I and II, in their free base forms; in the form of pharmacologically acceptable acid addition salts, for example, hydrochlorides or citrates; as lower-alkyl quaternary ammonium salts, i.e., alkyl of 1 to 8 carbon atoms, inclusive; and as amine oxides are active against *T. vaginalis*, *E. histolytica*, and *N. muris* and can be used to treat infections in mammals, birds, and other animals caused by such parasites, or for eradicating such parasites from inanimate objects. The novel compounds of the invention are also active as central nervous system stimulants and can be used for stimulating mammals, birds, and other animals. The compounds of the invention are further active as diuretics and can be administered to mammals and other animals to produce diuresis.

The higher-alkyl quaternary ammonium salts of the novel free base compounds of Formulas I and II, for example, wherein the alkyl group is of 9 to 20 carbon atoms, inclusive, exhibit valuable surface-active and cation-active wetting and emulsifying properties, and also exhibit valuable bacteriostatic and bactericidal activity. These higher-alkyl quaternary ammonium salts are useful as detergent-sanitizers and can be employed to sanitize equipment used in the processing and preparation of foods, for example, fruit, meat, milk, and the like.

The free base and acid addition salt compounds of the invention are useful as intermediates in preparing the alkyl quaternary ammonium salts of the invention.

The thiocyanic acid addition salts of the compounds of Formulas I and II, when condensed with formaldehyde, form resinous materials useful as pickling inhibitors according to U.S. Patents 2,425,320 and 2,606,155. The free base compounds of Formulas I and II also form fluosilicic acid addition salts and alkyl quaternary ammonium fluosilicates which are useful as mothproofing agents according to U.S. Patents 1,915,334 and 2,075,359.

The salts can be formed either by neutralization of the free base form of a compound of Formula I or Formula II with the free acid form, or by a metathetical exchange of the anion of an acid addition or quaternary salt of a compound of Formula I or Formula II, for example, the chloride ion of a hydrochloride, with the anionic form of the acid.

The following examples are illustrative of the process and products of the present invention, but are not to be construed as limiting.

*Example 1.—Preparation of 2-isopropylideneamino-oxypyridine and the hydrochloride thereof*

To an ethanolic sodium ethoxide solution [prepared from 22.6 g. (0.983 g. atom) of metallic sodium and 500 ml. of absolute ethanol] was added 71.8 g. (0.983 mole) of acetone oxime. The mixture was heated and intermittently agitated until complete solution occurred. After addition of 155.3 g. (0.983 mole) of 2-bromopyridine, the solution was refluxed in an atmosphere of nitrogen for 8 hrs. The reaction mixture was cooled and filtered, and the filtrate was evaporated under reduced pressure until a major portion of the ethanol had been removed. To the concentrate was added one liter of ether and 250 ml. of water. The mixture was thoroughly shaken and the organic layer was separated. The organic layer was dried over anhydrous magnesium sulfate, filtered, and the filtrate was evaporated to dryness. The brown oil thus obtained was distilled and 33.1 g. of 2-isopropylideneamino-oxypyridine as a colorless liquid boiling at 85° C. to 95° C. at 2.3 to 3.5 mm. of mercury pressure was recovered. The liquid 2-isopropylideneamino-oxypyridine was dissolved in ether and the solution was treated with ethereal hydrogen chloride. The resulting precipitate was recrystallized three times from an ethanol-ether mixture, to obtain fine white flakes of 2-isopropylideneamino-oxypyridine hydrochloride having a melting point of 148° to 149° C. (with decomposition).

*Analysis.*—Calcd. for $C_8H_{11}ClN_2O$: C, 51.48; H, 5.94; N, 15.01. Found: C, 51.15; H, 5.57; N, 14.78.

*Example 3.—Preparation of 4-isopropylideneamino-oxypyridine*

To an ethanolic sodium ethoxide solution prepared by reacting 32.2 g. (1.40 g. atoms) of metallic sodium with 400 ml. of absolute ethanol was added 102 g. (1.40 moles) of acetone oxime. After solution was effected, the ethanol was removed by evaporation under reduced pressure. The dry powdered sodium salt of acetone oxime thus obtained was slurried in 650 ml. of dry tert-butanol and 200 g. (1.26 moles) of 2-bromopyridine was added. The mixture was refluxed for 8 hrs. in an atmosphere of nitrogen. After cooling the reaction mixture and filtering, most of the solvent was evaporated from the filtrate. To the concentrate thus obtained, one liter of ether and 250 ml. of water were added. The mixture was thoroughly shaken and the organic layer was separated. After drying over anhydrous magnesium sulfate and evaporating to dryness, there was obtained by distillation 65.8 g. of 2-isopropylideneamino-oxypyridine having a boiling point of 63° to 72° C. at 1 mm. of mercury pressure.

*Example 3.—Preparation of 4-isoproylideneamino-oxypyridine and the hydrochloride thereof*

To a solution containing 1.42 moles of sodium ethoxide in 700 ml. of absolute ethanol was added 104 g. (1.42 moles) of acetone oxime. The mixture was heated gently until a solution was obtained. After adding 224 g. (1.42 moles) of 4-bromopyridine, the mixture was heated under reflux in an atmosphere of nitrogen for 8 hrs. The reaction mixture was cooled and filtered, and the filtrate was heated under reduced pressure until most of the ethanol had been evaporated. To the concentrate was added one liter of ether and 250 ml. of water. This mixture was thoroughly shaken and the organic layer was separated. The organic layer was dried over anhydrous magnesium sulfate, filtered, and evaporated to give an oily residue. On distillation there was obtained 68.8 g. of 4-isopropylideneamino-oxypyridine as a colorless liquid, boiling between 70° C. and 88° C. at 4.5 mm. of mercury pressure. The liquid 4-isopropylideneamino-oxypyridine was dissolved in ether and the solution was treated with ethereal hydrogen chloride. The resulting precipitate was recrystallized three times from an ethanol:ether mixture, to obtain 4-isopropylideneamino-oxypyridine hydrochloride as fine white needles having a melting point of 192° to 193° C. (with decomposition).

*Analysis.*—Calcd. for $C_8H_{11}ClN_2O$: C, 51.48; H, 5.94; N, 15.01. Found: C, 51.59; H, 6.05; N, 14.86.

To a portion of the hydrochloride prepared above was added concentrated ammonium hydroxide. The alkaline mixture was extracted several times with chloroform, and the chloroform extracts were dried over anhydrous magnesium sulfate, filtered, and evaporated to dryness. Distillation of the liquid thus obtained yielded 4-isopropylideneamino-oxypyridine (B.P. 121° C. at 14 mm.) as a colorless liquid which soon solidified (M.P. 58° to 60° C.). Two recrystallizations from hexane gave long, white blades of 4-isopropylideneamino-oxypyridine having a melting point of 59° to 60° C.

*Analysis.*—Calcd. for $C_8H_{10}N_2O$: C, 63.98; H, 6.71; N, 18.65. Found: C, 64.42; H, 7.06; N, 18.25.

*Example 4*

Following the procedure of Example 2, but substituting acetaldehyde oxime, propionaldehyde oxime, isobutyraldehyde oxime, valeraldehyde oxime, 2-methylbutyraldehyde oxime, heptaldehyde oxime, pelargonaldehyde oxime, diethyl ketone oxime, methyl propyl ketone oxime, diisopropyl ketone oxime, methyl sec.-butyl ketone oxime, methyl isohexyl ketone oxime, dipentyl ketone oxime, methyl neopentyl ketone oxime, ethyl heptyl ketone oxime, and dioctyl ketone oxime for acetone oxime, there were prepared 2-ethylidene-, 2-propylidene-, 2-isobutylidene-, 2-pentylidene-, 2-(2-methylbutylidene)-, 2-heptylidene-, 2-nonylidene-, 2-(1-ethylpropylidene)-, 2-(1-methylbutylidene)-, 2-(1-isopropyl-2-methylpropylidene)-, 2-(1,2-dimethylbutylidene)-, 2-(1,5-dimethylhexylidene)-, 2-(1-pentylhexylidene)-, 2-(1,3,3-trimethylbutylidene)-, 2-(1-ethyloctylidene)-, and 2-(1-octylnonylidene)amino-oxypyridines, respectively.

Following the same procedure, but substituting 4-bromopyridine for 2-bromopyridine, the corresponding 4-alkylidene amino-oxypyridines are prepared.

I claim:
1. Compounds selected from the group consisting of (1) O-pyridyl ether oximes having in their free base form the formula selected from the group consisting of

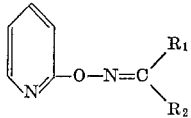

and

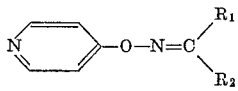

wherein $R_1$ is selected from the group consisting of hydrogen and lower-alkyl and $R_2$ is lower-alkyl and (2) acid addition salts, alkyl quaternary ammonium salts wherein alkyl is of from 1 to 20 carbon atoms, inclusive, and $N_1$-oxides thereof.

2. Acid addition salts of the free base compounds according to claim 1.
3. 2-isopropylideneamino-oxypyridine hydrochloride.
4. 4-isopropylideneamino-oxypyridine hydrochloride.
5. O-pyridyl ether oximes of the formula selected from the group consisting of

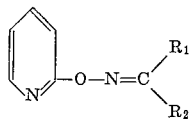

and

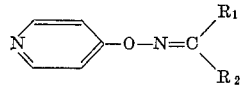

wherein $R_1$ is selected from the group consisting of hydrogen and lower-alkyl and $R_2$ is lower-alkyl.

6. 2-isopropylideneamino-oxypyridine.
7. 4-isopropylideneamino-oxypyridine.
8. The process which comprises reacting an oxime of the formula

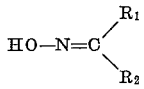

wherein $R_1$ is selected from the group consisting of hydrogen and lower-alkyl and $R_2$ is lower-alkyl with a 2-halopyridine or 4-halopyridine in the presence of a base and an organic solvent in which the oxime and halopyridine are appreciably soluble.

No references cited.

WALTER A. MODANCE, *Primary Examiner.*
NICHOLAS RIZZO, *Examiner.*